United States Patent
Hori et al.

(10) Patent No.: US 11,287,698 B2
(45) Date of Patent: Mar. 29, 2022

(54) LIQUID CRYSTAL DISPLAY APPARATUS

(71) Applicant: SAKAI DISPLAY PRODUCTS CORPORATION, Sakai (JP)

(72) Inventors: Mayumi Hori, Sakai (JP); Kazuhiko Negoro, Sakai (JP); Kenichi Iwamoto, Sakai (JP); Akira Toyama, Sakai (JP); Makoto Noda, Sakai (JP)

(73) Assignee: SAKAI DISPLAY PRODUCTS CORPORATION, Sakai (JP)

( * ) Notice: Subject to any disclaimer, the term of this patent is extended or adjusted under 35 U.S.C. 154(b) by 0 days.

(21) Appl. No.: 17/280,121

(22) PCT Filed: Sep. 25, 2018

(86) PCT No.: PCT/JP2018/035380
§ 371 (c)(1),
(2) Date: Mar. 25, 2021

(87) PCT Pub. No.: WO2020/065713
PCT Pub. Date: Apr. 2, 2020

(65) Prior Publication Data
US 2022/0004060 A1    Jan. 6, 2022

(51) Int. Cl.
*G02F 1/1335* (2006.01)
*G02F 1/13357* (2006.01)
*F21V 8/00* (2006.01)

(52) U.S. Cl.
CPC ..... *G02F 1/133628* (2021.01); *G02B 6/0073* (2013.01); *G02F 1/133603* (2013.01); *G02F 1/133608* (2013.01)

(58) Field of Classification Search
CPC ......... G02F 1/133628; G02F 1/133608; G02F 1/133603
See application file for complete search history.

(56) References Cited

U.S. PATENT DOCUMENTS 8,564,741 B2 * 10/2013 Kimura ................ F21V 29/51
349/65
2007/0147045 A1   6/2007 Kimura et al.
2011/0234566 A1   9/2011 Asano et al.
2012/0229726 A1   9/2012 Kim
(Continued)

FOREIGN PATENT DOCUMENTS

JP   2001-142409 A   5/2001
JP   2007-200869 A   8/2007
(Continued)

*Primary Examiner* — Vip Patel
(74) *Attorney, Agent, or Firm* — ScienBiziP, P.C.

(57) ABSTRACT

A liquid crystal display apparatus includes a liquid crystal display panel and a backlight device disposed on a rear face of the liquid crystal display panel. The backlight device includes a chassis, a plurality of LED units being disposed on the chassis and arranged in at least one direction, and a cooling structure thermally coupled to rear faces of the plurality of LED units. The cooling structure includes a plurality of enclosed spaces, each of the plurality of enclosed spaces containing a coolant in which a liquid phase and a gas phase coexist at room temperature. Each of the plurality of enclosed spaces is disposed correspondingly to at least one LED unit among the plurality of LED units arranged in the at least one direction.

9 Claims, 7 Drawing Sheets

(56) References Cited

U.S. PATENT DOCUMENTS

2012/0293535 A1  11/2012  Nozawa
2014/0240956 A1   8/2014  Nishio et al.

FOREIGN PATENT DOCUMENTS

| JP | 2011-203322 A | 10/2011 |
| JP | 2013-098150 A | 5/2013 |
| JP | 2014-186069 A | 10/2014 |
| JP | 2017-076563 A | 4/2017 |
| WO | 2011/089778 A1 | 7/2011 |

* cited by examiner (a)

(b)

LIQUID CRYSTAL DISPLAY APPARATUS

TECHNICAL FIELD

The present invention relates to a liquid crystal display apparatus, and more particularly to a liquid crystal display apparatus that includes an LED backlight device.

BACKGROUND ART

Many liquid crystal display apparatuses that are currently commercially available include a backlight device having a plurality of LEDs. For example, the plurality of LEDs are grouped into a plurality of regions, such that only those LEDs which are in regions where illumination light is needed may be activated, or that each region may be adjusted to the required luminance. Such a driving method for a backlight is referred to as area division driving, partial driving, or local dimming. Adopting an area division driving technique allows for reducing the power consumption of a liquid crystal display apparatus.

In recent years, High Dynamic Range (hereinafter referred to as "HDR") technology has come to be introduced in order to improve the display quality of display apparatuses. In the case of a liquid crystal display apparatus, through area division driving of its backlight device, displaying is locally performed at higher luminances than conventional, in response to an HDR signal. Split driving techniques concerning a backlight device are described in Patent Document 1 for direct types, and in Patent Document 2 for edge light types, for example.

On the other hand, an increasing operating temperature may lead to e.g. a shorter life of an LED. Therefore, cooling structures for efficiently releasing the heat generated by LEDs are under study. For example, Patent Document 3 discloses a structure where heat that is generated by an LED is radiated not via its housing (chassis) but from a heat sink (made of e.g. aluminum) that is connected to the rear face of a substrate of the LED device.

CITATION LIST

Patent Literature

[Patent Document 1] Japanese Laid-Open Patent Publication No. 2001-142409
[Patent Document 2] Japanese Laid-Open Patent Publication No. 2011-203322
[Patent Document 3] Japanese Laid-Open Patent Publication No. 2017-76563

SUMMARY OF INVENTION

Technical Problem

However, in the cooling structure described in Patent Document 3, it may not be possible to effectively suppress a drastic temperature increase in those LEDs which are locally raised to high luminance for e.g. HDR processing.

Therefore, an objective of the present invention is to provide a liquid crystal display apparatus that includes a cooling structure which is capable of effectively suppressing a drastic temperature increase in LEDs.

Solution to Problem

A liquid crystal display apparatus according to an embodiment of the present invention comprises a liquid crystal display panel and a backlight device disposed on a rear face of the liquid crystal display panel, wherein, the backlight device includes a chassis, a plurality of LED units being disposed on the chassis and arranged in at least one direction, and a cooling structure thermally coupled to rear faces of the plurality of LED units; the cooling structure includes a plurality of first enclosed spaces, each of the plurality of first enclosed spaces containing a coolant in which a liquid phase and a gas phase coexist at room temperature; and each of the plurality of first enclosed spaces is disposed correspondingly to at least one LED unit among the plurality of LED units arranged in the at least one direction.

In one embodiment, the plurality of LED units may be disposed on the chassis, or a light-emitting portion (e.g., an LED chip) of each of the plurality of LED units may be exposed through a respective one of a plurality of apertures in the chassis, and an LED substrate of each of the plurality of LED units may be directly coupled to the cooling structure outside of the chassis.

In one embodiment, the plurality of LED units are arranged in a matrix having a plurality of rows and a plurality of columns, and each of the plurality of first enclosed spaces is disposed correspondingly to at least one LED unit belonging to one of the plurality of rows of the plurality of LED units.

In one embodiment, the at least one LED unit comprises at least two LED units.

In one embodiment, the at least one LED unit comprises all LED units belonging to the one of the plurality of rows of the plurality of LED units.

In one embodiment, the plurality of LED units define a plurality of units of area division driving; and each of the plurality of first enclosed spaces is disposed correspondingly to at least two LED units belonging to two or more different units of driving among the plurality of units of area division driving.

In one embodiment, the cooling structure includes a plurality of second enclosed spaces, the plurality of second enclosed spaces containing a coolant in which a liquid phase and a gas phase coexist at room temperature; and each of the plurality of second enclosed spaces is thermally coupled to at least one of the plurality of first enclosed spaces.

In one embodiment, each of the plurality of second enclosed spaces is thermally coupled to an upper face of the at least one of the plurality of first enclosed spaces.

In one embodiment, each of the plurality of second enclosed spaces is thermally coupled to at least two of the plurality of first enclosed spaces.

In one embodiment, the backlight device further includes a light guiding plate, and the plurality of LED units arranged in the at least one direction are arranged along one side face of the light guiding plate. In other words, the backlight device may be of edge light type.

In one embodiment, the plurality of LED units arranged in the at least one direction comprise at least two LED units.

In one embodiment, the plurality of LED units arranged in the at least one direction comprise all LED units among the plurality of LED units arranged in the one direction.

In one embodiment, the plurality of LED units define a plurality of units of area division driving; and each of the plurality of first enclosed spaces is disposed correspondingly to at least two LED units belonging to two or more different units of driving among the plurality of units of area division driving.

In one embodiment, the cooling structure includes a plurality of second enclosed spaces, the plurality of second enclosed spaces containing a coolant in which a liquid phase and a gas phase coexist at room temperature; and each of the plurality of second enclosed spaces is thermally coupled to at least one of the plurality of first enclosed spaces.

In one embodiment, each of the plurality of second enclosed spaces is thermally coupled to an upper face of the at least one of the plurality of first enclosed spaces.

In one embodiment, each of the plurality of second enclosed spaces is thermally coupled to at least two of the plurality of first enclosed spaces.

Advantageous Effects of Invention

According to an embodiment of the present invention, a liquid crystal display apparatus that includes a cooling structure which is capable of effectively suppressing a drastic temperature increase in LEDs is provided.

DESCRIPTION OF EMBODIMENTS

Hereinafter, with reference to the drawings, a liquid crystal display apparatus according to an embodiment of the present invention will be described. What is illustrated below is an exemplary liquid crystal display apparatus in which, through area division driving of a backlight device, displaying is locally performed at higher luminances in response to an HDR signal; however, embodiments of the present invention are not limited thereto.

Figure 1:
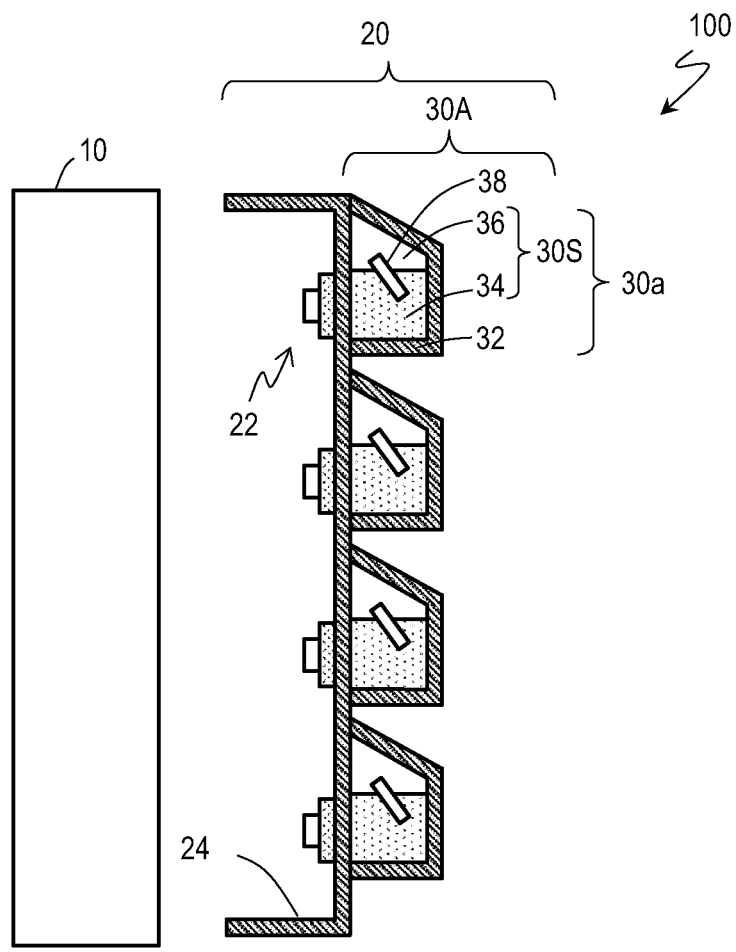
FIG. 1 A schematic cross-sectional view of a liquid crystal display apparatus 100 according to an embodiment of the present invention.

FIG. 1 is a schematic cross-sectional view showing a liquid crystal display apparatus 100 according to an embodiment of the present invention. The liquid crystal display apparatus 100 is suitably used for e.g. a television set, and is to be observed while the screen is kept essentially upright.

The liquid crystal display apparatus 100 includes a liquid crystal display panel 10 and a backlight device 20 disposed on a rear face of the liquid crystal display panel 10. The backlight device 20 includes: a chassis 24; a plurality of LED units 22 being disposed on the chassis 24 and arranged in at least one direction; and a cooling structure (also referred to as a radiation structure) 30A that is thermally coupled to rear faces of the plurality of LED units 22. The cooling structure 30A includes a plurality of enclosed spaces 30S, such that each of the plurality of enclosed spaces 30S contains a coolant in which a liquid phase 34 and a gas phase 36 coexist at room temperature, each of the plurality of enclosed spaces 30S being disposed correspondingly to at least one LED unit 22 among the plurality of LED units 22 that are arranged in the at least one direction. Between the liquid crystal display panel 10 and the backlight device 20, an optical film such as a light-diffusing plate not shown may be disposed as necessary.

Figure 2:
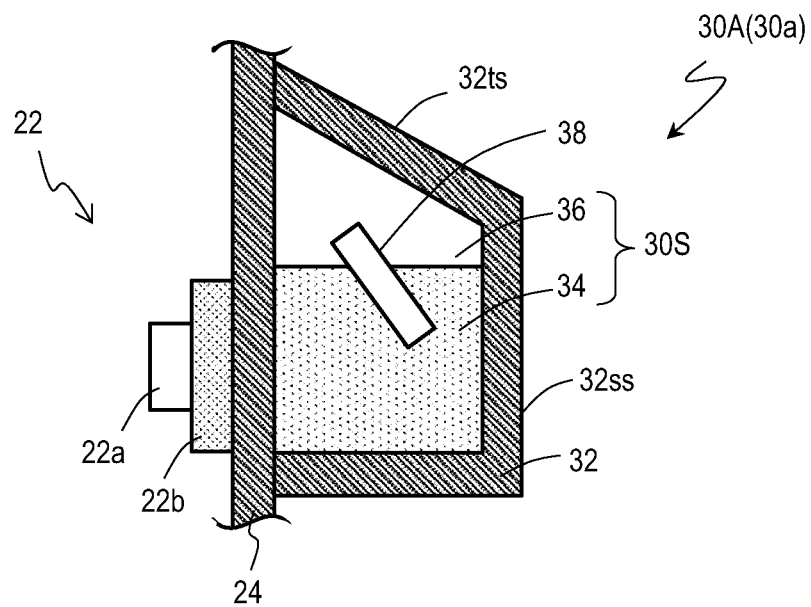
FIG. 2 A schematic cross-sectional view of a portion of a cooling structure 30A of a backlight device 20 that the liquid crystal display apparatus 100 includes.

Now, with reference to FIG. 2, the structure of the cooling structure 30A of the backlight device 20 will be described in detail. FIG. 2 is a schematic cross-sectional view of a portion (unit cooling structure 30a) of the cooling structure 30A. The LED unit 22 includes, for example: an LED chip 22a and an LED substrate 22b supporting the LED chip 22a. The LED unit 22 is further covered by a sealing member (not shown) that protects the LED chip 22a. The sealing member may also serve as an optical element to control light distribution. The sealing member is made of a resin (e.g. a silicone resin) or glass. Although the example herein illustrates a case where one LED unit 22 includes one LED chip 22a, this is not a limitation; one LED unit 22 may include two or more two or more LED chips (which emit light of different colors, for example). The LED substrate 22b preferably has a high heat-releasing ability (thermal conductivity); for example, a substrate of high thermal conductivity (printed wiring board: PWB) may preferably be used. As a specific example, it may be a resin substrate, including a composite substrate of a glass woven fabric and an epoxy resin (ANSI/NEMA standards: FR-4) and a composite substrate of a glass non-woven fabric and an epoxy resin (ANSI/NEMA standards: CEM-3), or a metal substrate of aluminum or the like.

Figure 4:
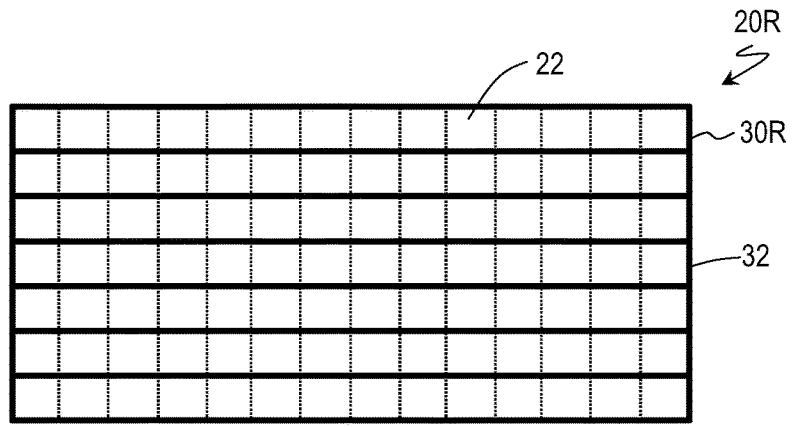
FIG. 4 (a) and (b) are plan views schematically showing arrangements of unit cooling structures (enclosed spaces) of a backlight device that the liquid crystal display apparatus 100 may include.
Figure 4:
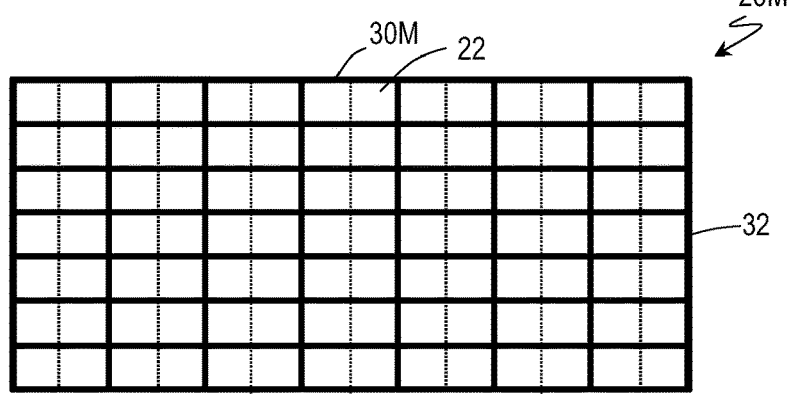

The backlight device 20 is of direct type, in which the plurality of LED units 22 are arranged in a matrix having a plurality of rows and a plurality of columns. In FIG. 1, for simplicity, one column's worth of LED units 22 that are arranged in four rows are illustrated; however, as will be appreciated, the number of LED units 22 may vary depending on the size of the liquid crystal display apparatus, and they may be arranged in a matrix of several hundred rows by several hundred columns. Moreover, as will be described later with reference to FIG. 11, a liquid crystal display apparatus according to an embodiment of the present invention may include a backlight device of edge light type. In this case, the plurality of LED units are to be arranged in one direction. In either case, an enclosed space 30S of the cooling structure 30A is provided correspondingly to at least one LED unit 22. In other words, one enclosed space 30S may be provided correspondingly to one LED unit 22; or, for example, one enclosed space 30S may be provided correspondingly to one row of LED units 22. The relationship between the arrangement of the LED units 22 and the enclosed spaces 30S will be described later with reference to FIG. 4.

Figure 3:
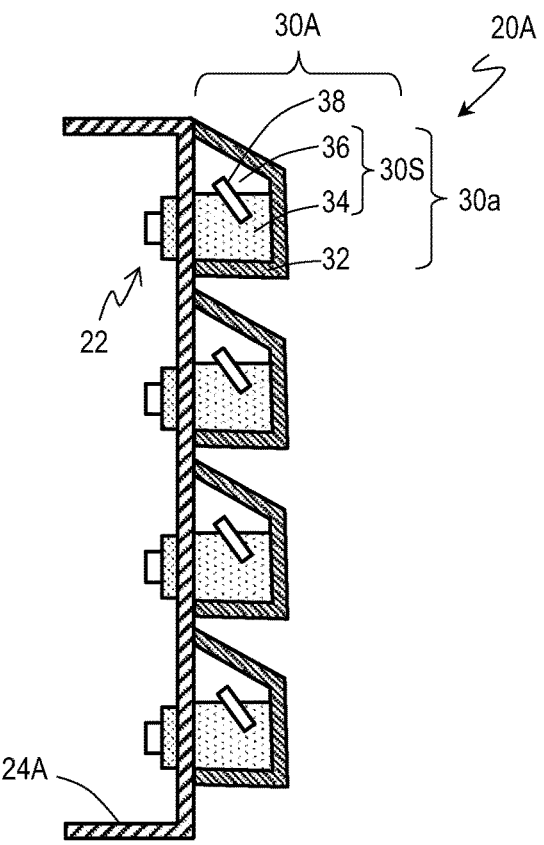
FIG. 3 A schematic cross-sectional view of another backlight device 20A that the liquid crystal display apparatus 100 may include.

Within the cooling structure 30A, a portion defining a single enclosed space 30S is referred to as the unit cooling structure shown in 30a. As shown in FIG. 2, the unit cooling structure 30a is composed of the chassis 24 and an outer wall 32. The enclosed space 30S is thermally coupled to the LED unit 22 via the chassis 24. The chassis 24 and the outer wall 32 are made of a metal having a high thermal conductivity (heat-releasing ability), for example. As the metal, for example, iron, aluminum, and alloys containing these may suitably be used. In the backlight device 20 shown in FIG. 1, the chassis 24 and the outer wall 32 are made of the same material, although this is not a limitation; for example, as in the backlight device 20A shown in FIG. 3, the chassis 24A and the outer wall 32 may be made of different materials.

As used of two component elements, being "thermally coupled" means that they are in direct contact, or in contact via a member of high thermal conductivity. Herein, the chassis 24 constitutes a portion of the unit cooling structure 30a, and the chassis 24 is in direct contact with the LED unit 22; therefore, the unit cooling structure 30a is in direct contact with the LED unit 22. On the other hand, from the perspective of the enclosed space 30S, the enclosed space 30S is in contact with the LED unit 22 via the chassis 24.

As shown in FIG. 2, the enclosed space 30S is filled with a coolant in which a liquid phase 34 and a gas phase 36 coexist at room temperature. Note that the enclosed space 30S is filled with air as well as the coolant.

For example, when the power that is supplied to the LED chip 22a is increased for the purpose of HDR processing, the amount of generated heat from the LED chip 22a increases. Via the LED substrate 22b and the chassis 24, the heat generated in the LED chip 22a is transmitted to the coolant (liquid phase) 34 within the enclosed space 30S. The coolant (liquid phase) 34 absorbs the transmitted heat and vaporizes (evaporates). At this time, the heat that is absorbed by the coolant (liquid phase) 34 includes a latent heat and a sensible heat. Therefore, by using a liquid of large latent heat (e.g. water) as the coolant, the heat generated in the LED chip 22a can be efficiently absorbed by the coolant (liquid phase) 34; that is, a temperature increase in the LED chip 22a can be suppressed. The coolant (gas phase) 36 having vaporized loses heat via an upper face 32ts of the outer wall 32, and is liquefied back into the liquid phase 34. Thus, by utilizing the latent heat of the coolant (liquid phase) 34, the LED chip 22a can be efficiently cooled.

Note that a convection control plate 38 is preferably provided in the enclosed space 30S. The convection control plate 38 is tilted, from an upper portion of the high-temperature side (i.e., the side closer to the LED unit 22) within the enclosed space 30S (i.e., upper left in FIG. 2) toward a lower portion of the low-temperature side (i.e., the side farther away from the LED unit 22) within the enclosed space 30S (i.e., lower right in FIG. 2). Therefore, when any coolant (liquid phase) 34 that is near the LED unit 22 vaporizes, the gas of the coolant is efficiently led by the convection control plate 38 to the upper portion of the high-temperature side (i.e., the side closer to the LED unit 22) within the enclosed space 30S (i.e., upper left in FIG. 2). Note that the upper face 32ts is also tilted from the upper portion of the high-temperature side (i.e., the side closer to the LED unit 22) within the enclosed space 30S (i.e., upper left in FIG. 2) toward the lower portion of the low-temperature side (i.e., the side farther away from the LED unit 22) within the enclosed space 30S (i.e., lower right in FIG. 2). In other words, the enclosed space 30S is formed so that the volume of the gas phase 36 at the high-temperature side (i.e., the side closer to the LED unit 22) is large.

The gas of the coolant having reached the upper face 32ts loses heat at the upper face 32ts, and, along the tilt of the upper face 32ts, moves to the low-temperature side (i.e., the side farther away from the LED unit 22) within the enclosed space 30S, so as to be liquefied at the low-temperature side of the convection control plate 38 back into the liquid phase 34. In other words, the coolant within the enclosed space 30S undergoes a counterclockwise convection around the convection control plate 38 (i.e. lower left→upper left→upper right→lower right).

Similarly to the chassis 24 or the outer wall 32, the convection control plate 38 may be made of e.g. a metal having a high thermal conductivity, and is joined to the outer wall 32 of the unit cooling structure 30a (i.e., the outer wall 32 extending along the vertical direction in FIG. 4(a) or (b)).

An increasing temperature may lead to e.g. a shorter life of the LED chip 22a. For example, in order to attain a predetermined life, it may be necessary to limit the operating time at any temperature exceeding a rated temperature (e.g. 100° C.) to within a predetermined period (e.g. two and a half minutes). By using the cooling structure 30A, which utilizes latent heat, it becomes possible to keep the LED chip 22a at the rated temperature or below even during HDR processing. The specific structure of the cooling structure 30A is to be set as appropriate for the maximum amount of generated heat (during HDR processing) of the LED chip 22a.

FIGS. 4(a) and (b) are plan views schematically showing arrangements of unit cooling structures (enclosed spaces) in a backlight device that the liquid crystal display apparatus 100 may include. FIGS. 4(a) and (b) show the entire region of the backlight device corresponding to the liquid crystal display panel.

A backlight device 20R shown in FIG. 4(a) includes a unit cooling structure (enclosed space) 30R corresponding to each of a plurality of rows of LED units 22, which are arranged in a matrix. On the other hand, a backlight device 20M shown in FIG. 4(b) include a plurality of unit cooling structures (enclosed spaces) 30M arranged in a matrix, each unit cooling structure (enclosed space) 30M being provided correspondingly to two LED units 22 belonging to the same row. As will be appreciated, this is not a limitation; this may be modified so that each unit cooling structure (enclosed space) 30M corresponds to three or more LED units 22.

Note that, in the context of area division-driving the plurality of LED units 22, if the smallest unit to be area division-driven is referred to as the "unit of area division driving", then the unit of area division driving may include two or more contiguous LED units 22. In this case, an enclosed space 30M may be disposed correspondingly to two or more LED units 22 that are included in the same unit of area division driving, or disposed correspondingly to two or more LED units 22 belonging to two or more different units of driving. If an enclosed space 30M is disposed correspondingly to two or more LED units 22 belonging to two or more different units of driving, then the enclosed space 30M may only need to suppress a temperature increase in less-than-all LED units 22 among the two or more corresponding LED units 22, in which case a more effective radiation would be possible.

Figure 5:
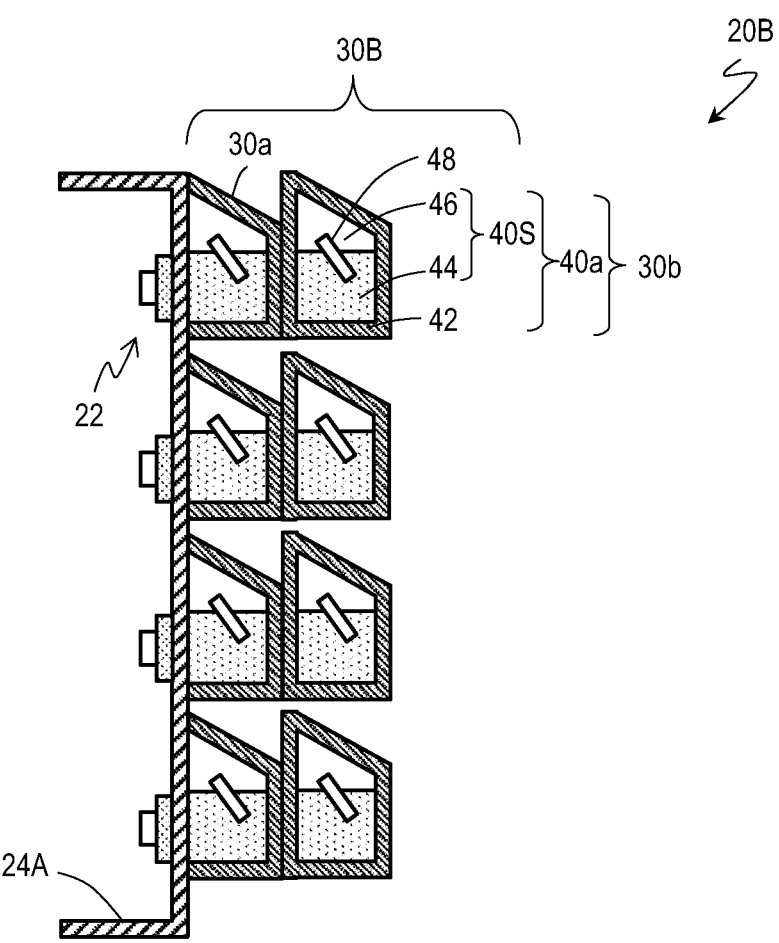
FIG. 5 A schematic cross-sectional view of still another backlight device 20B that the liquid crystal display apparatus 100 according to an embodiment of the present invention may include.
Figure 6:
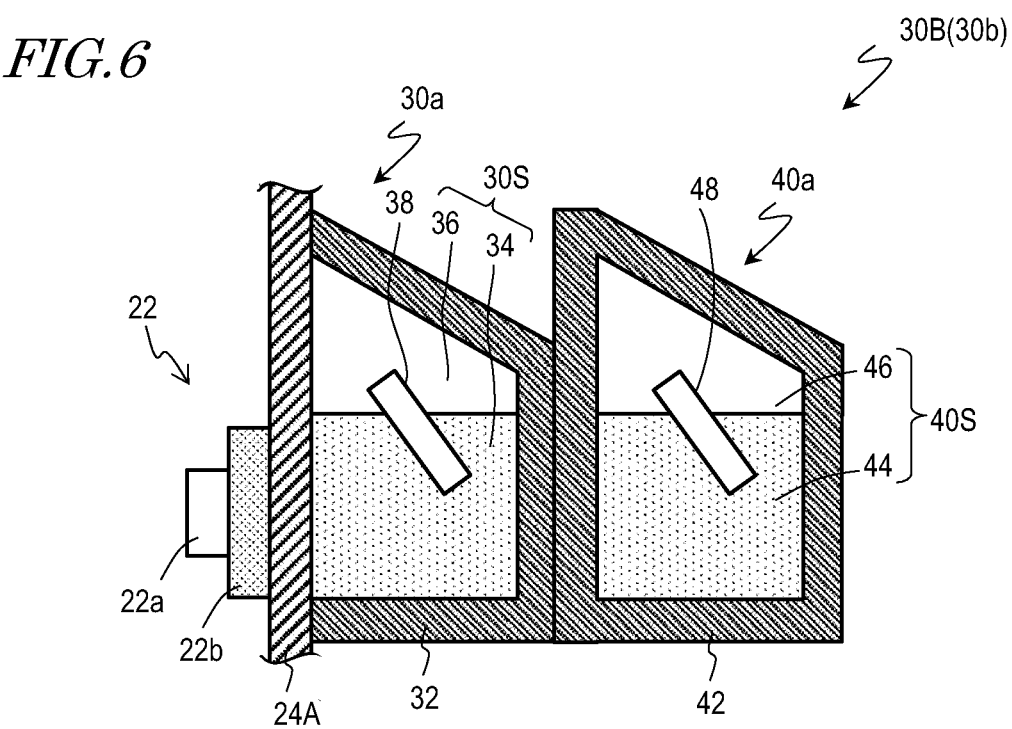
FIG. 6 A schematic cross-sectional view of a portion of a cooling structure 30B that the backlight device 20B includes.

FIG. 5 shows a schematic cross-sectional view of still another backlight device 20B that the liquid crystal display apparatus 100 according to an embodiment of the present invention may include. FIG. 6 shows a schematic cross-sectional view of a portion (unit cooling structure 30b) of a cooling structure 30B that the backlight device 20B includes.

The plurality of unit cooling structures 30b included in the cooling structure 30B of the backlight device 20B each include a unit cooling structure 40a (enclosed space 40S) that is thermally coupled to a unit cooling structure 30a (enclosed space 30S). The unit cooling structure 40a is thermally coupled to a side face 32ss (see FIG. 2) of the unit cooling structure 30a. Each enclosed space 40S contains a coolant in which a liquid phase 44 and a gas phase 46 coexist at room temperature, and is surrounded by an outer wall 42. The coolant with which to fill the enclosed space 40S may be the same as or different from the coolant filling the enclosed space 30S. Since water has a large latent heat, the enclosed space 40S is also preferably filled with water.

An enclosed space 40S may be provided for each enclosed space 30S, or thermally coupled to two or more enclosed spaces 30S. Since only a limited group of LED units 22 will undergo a drastic increase in temperature in response to HDR processing, if two or more enclosed spaces 30S corresponding to the enclosed space 40S happen to include an enclosed space 30S corresponding to an LED unit 22 which does not undergo a drastic temperature increase, then the burden of radiation by the enclosed space 40S can be reduced, thereby being able to more effectively cool the coolant (gas phase) 36 within the enclosed space 30S.

As is the case with the enclosed space 30S, the enclosed space 40S also preferably has a convection control plate 48 provided therein. The convection control plate 48 is tilted from an upper portion of the high-temperature side (i.e., the side closer to the LED unit 22) within the enclosed space 40S (i.e., upper left in FIG. 5) toward a lower portion of the low-temperature side (i.e., the side farther away from the LED unit 22) within the enclosed space 40S (i.e., lower right in FIG. 5).

Figure 7:
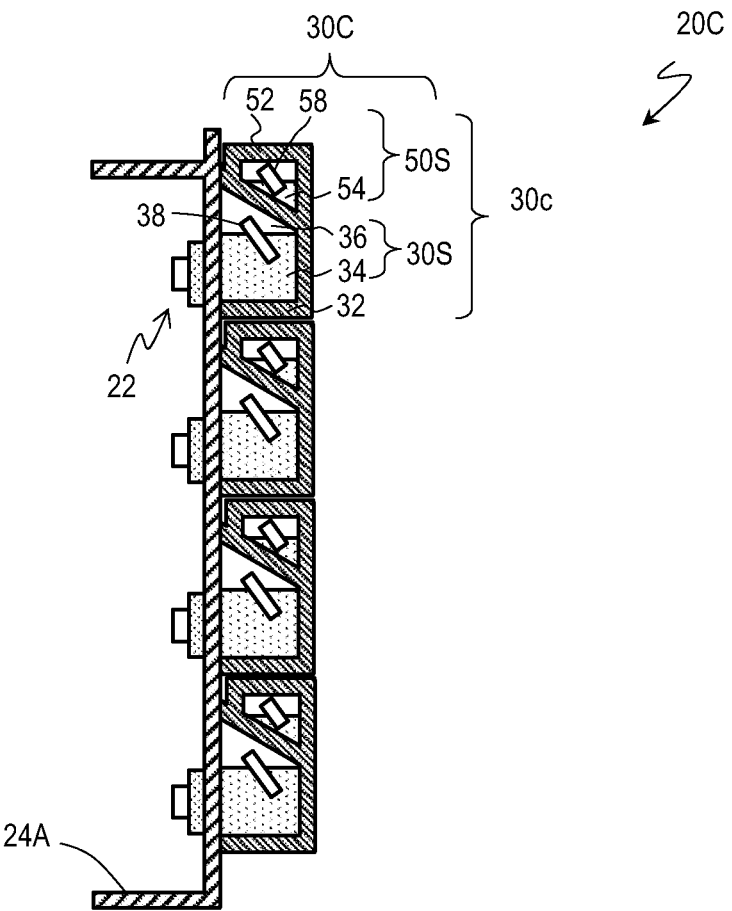
FIG. 7 A schematic cross-sectional view of still another backlight device 20C that the liquid crystal display apparatus 100 according to an embodiment of the present invention may include.
Figure 8:
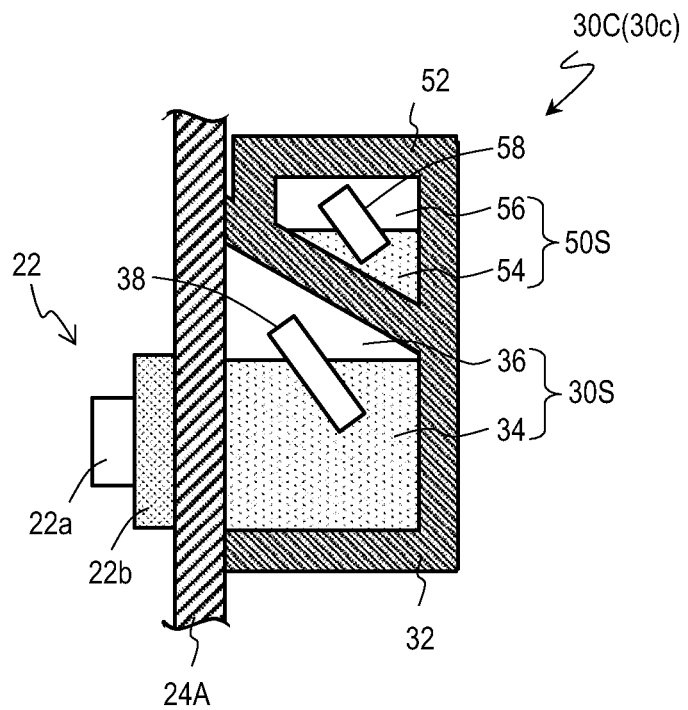
FIG. 8 A schematic cross-sectional view of a portion of a cooling structure 30C that the backlight device 20C includes.

FIG. 7 shows a schematic cross-sectional view of still another backlight device 20C that the liquid crystal display apparatus 100 according to an embodiment of the present invention may include. FIG. 8 shows a schematic cross-sectional view of a portion (unit cooling structure 30c) of a cooling structure 30C that the backlight device 20C includes.

A plurality of unit cooling structures 30c included in the cooling structure 30C of the backlight device 20C each include an enclosed space 50S thermally coupled to an enclosed space 30S (identical to the unit cooling structure 30a in FIG. 2). The enclosed space 50S is thermally coupled to an upper face is (see FIG. 2) of an outer wall 32 surrounding the enclosed space 30S, and is surrounded by the upper face of the outer wall 32 and by the outer wall 52. Each enclosed space 50S also contains a coolant in which a liquid phase 54 and a gas phase 56 coexist at room temperature. The coolant with which to fill the enclosed space 50S may be the same as or different from the coolant filling the enclosed space 30S. Since water has a large latent heat, the enclosed space 50S is also preferably filled with water.

As is the case with the enclosed space 30S, the enclosed space 50S also preferably has a convection control plate 58 provided therein. The convection control plate 58 is tilted from an upper portion of the high-temperature side (i.e., the side closer to the LED unit 22) within the enclosed space 50S (i.e., upper left in FIG. 7) toward a lower portion of the low-temperature side (i.e., the side farther away from the LED unit 22) within the enclosed space 50S (i.e., lower right in FIG. 7).

In the enclosed space 30S, the gas-phase coolant (water vapor) 36 is likely to lose heat through an upper face 32ts (see FIG. 2) of an outer wall 32, and therefore the enclosed space 50S is preferably thermally coupled to the upper face of the outer wall 32.

Note that the area of contact between the outer wall 52 of the enclosed space 50S and the chassis 24A is preferably small. Preferably, the coolant (liquid phase) 54 in the enclosed space 50S only performs a heat exchange between itself and the upper face 32ts of the outer wall 32, i.e., so as to cool the coolant (gas phase) 36 in the enclosed space 30S.

Figure 9:
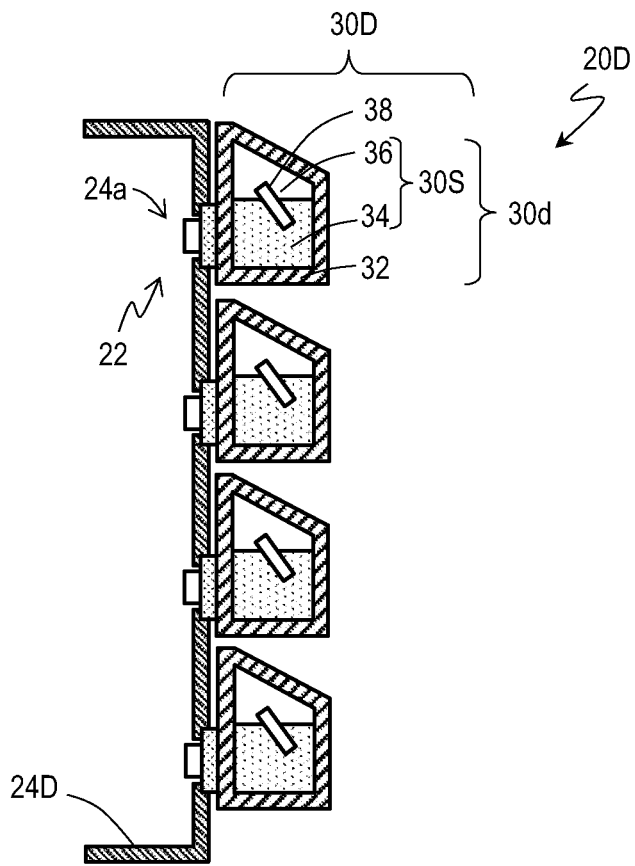
FIG. 9 A schematic cross-sectional view of still another backlight device 20D that the liquid crystal display apparatus 100 according to an embodiment of the present invention may include.
Figure 10:
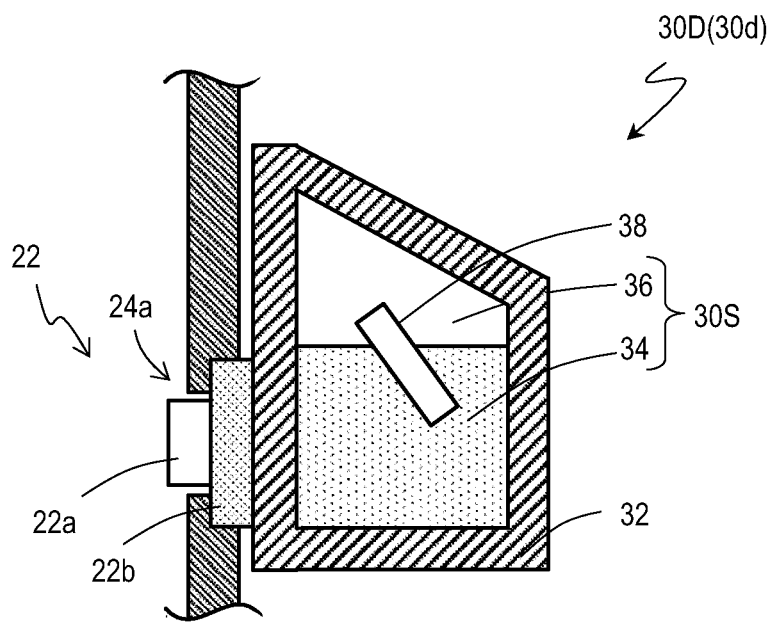
FIG. 10 A schematic cross-sectional view of a portion of a cooling structure 30D that the backlight device 20D includes.

Next, FIG. 9 shows a schematic cross-sectional view of still another backlight device 20D that the liquid crystal display apparatus 100 according to an embodiment of the present invention may include. FIG. 10 shows a schematic cross-sectional view of a portion (unit cooling structure 30d) of a cooling structure 30D that the backlight device 20D includes.

The cooling structure 30D differs from the cooling structure 30A shown in FIG. 1 in that the enclosed space 30S is thermally coupled to the LED unit 22 not via a chassis 24D, but via an outer wall 32 of the unit cooling structure 30d, which is formed independently from the chassis 24D. In other words, the chassis 24D has a plurality of apertures 24a, such that the light-emitting portion (e.g., the LED chip 22a) of each LED unit 22 is exposed through a respective one of the apertures 24a, and that the LED substrate 22b of each LED unit is directly coupled to the corresponding unit cooling structure 30d outside of the chassis 24D. Therefore, without dissipating through the chassis 24D, the heat generated in the LED unit 22 is directly led to the unit cooling structure 30d, thus resulting in an enhanced effect of locally cooling the LED unit 22. The cooling structure 30A, in which the chassis 24 is a member that is common to the plurality of unit cooling structures 30a such that the heat generated in each LED unit dissipates through the chassis 24D, is inferior to the cooling structure 30D in terms of locally-cooling effect.

It will be appreciated that the cooling structure 30D may be modified similarly to the cooling structure 30B shown in FIG. 5 or the cooling structure 30C shown in FIG. 7.

Figure 11:
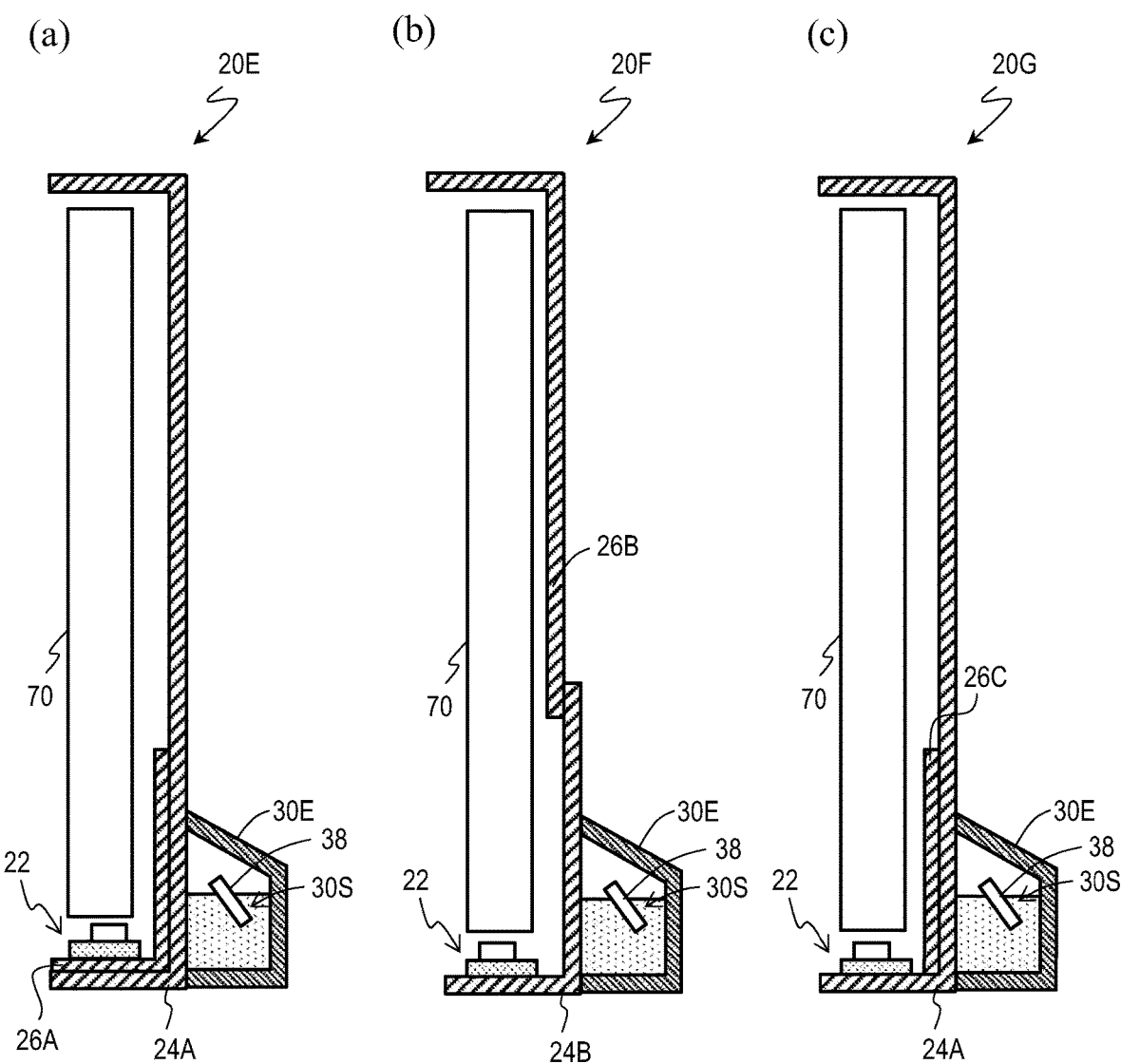
FIG. 11 (a) to (c) are schematic cross-sectional views of backlight devices 20E, 20F and 20G of edge light type that a liquid crystal display apparatus according to an embodiment of the present invention may include.

The above-described backlight devices 20, 20A, 20B, 20C and 20D are direct-type backlight devices, but may instead be edge light-type backlight devices as illustrated in FIGS. 11 (a) to (c).

Backlight devices 20E, 20F and 20G shown in FIGS. 11(a) to (c) each include a light guiding plate 70, such that a plurality of LED units 22 are arranged along one side face of the light guiding plate 70. The light guiding plate 70 has a rectangular shape (including a square); although an example is illustrated herein where the LED units 22 are arranged along a lower side face of the light guiding plate 70, the LED units 22 may be arranged along a left side face and/or a right side face.

A cooling structure 30E provided correspondingly to the LED units 22 arranged along the lower side face of the light guiding plate 70, as shown in FIGS. 11(a) to (c), may include the same enclosed spaces 30S (the unit cooling structures 30a in FIG. 1) as those of the cooling structure 30A shown in FIG. 1, for example. The arrangement of enclosed spaces 30S herein corresponds to one row in the arrangement of enclosed spaces shown in FIG. 4(a) or (b), for example. On the other hand, in the case where the LED units 22 are arranged along the right and left side faces, the cooling structure may be a structure corresponding to one column in the cooling structures 30A to 30D illustrated above.

In the case of an edge light type, the LED units 22 are arranged along one column (or one row), and therefore the chassis can be effectively utilized for radiation. Therefore, as shown in FIGS. 11(a) to (c), a thermally conductive plate 26A, 26B, 26C may be combined with a chassis 24A or 24B. The thermally conductive plates 26A, 26B and 26C may be made of the same material as the chassis 24A or 24B.

In the case of performing HDR processing by using an edge light-type backlight device, two or four edge light type backlight devices may be disposed along the upper and lower and/or right and left side faces of the light guiding plate 70 (see, for example, Japanese Laid-Open Patent Publication No. 2011-203322).

Figure 12:
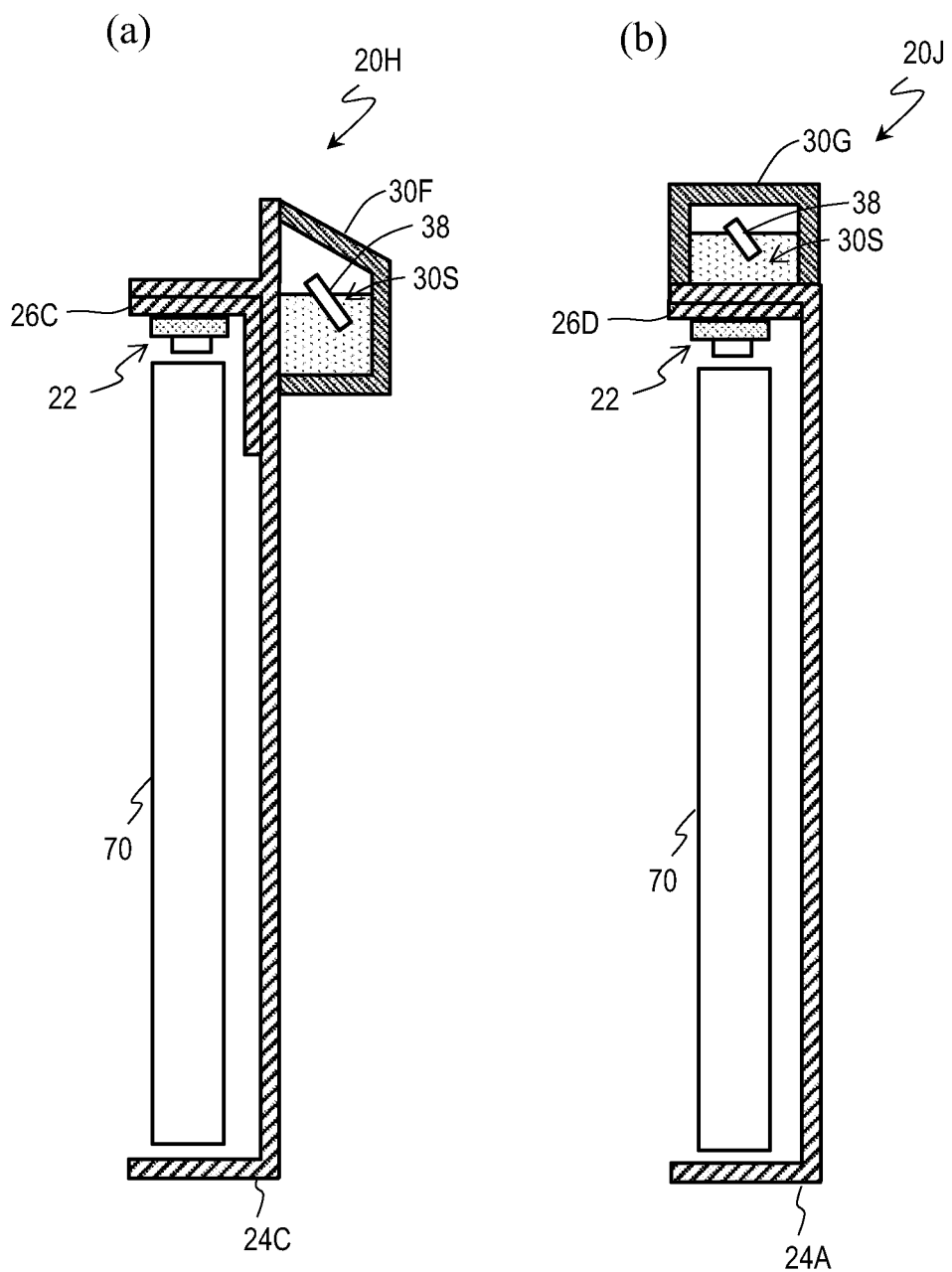
FIG. 12 (a) and (b) are schematic cross-sectional views of other backlight devices 20H and 20J of edge light type that a liquid crystal display apparatus according to an embodiment of the present invention may include.

The cooling structure to be provided correspondingly to the LED units 22 arranged along the upper side face of the light guiding plate 70 may be the cooling structure 30F or 30G shown in FIGS. 12(a) and (b), for example. The arrangement of unit cooling structures included in the cooling structure 30F or 30G may be identical to the arrangement of unit cooling structures included in the cooling structure 30E. As illustrated in FIG. 12(b), a thermally conductive plate 26D that is disposed only between the LED unit 22 and the enclosed space 30S may be used as a thermally conductive plate.

It will be appreciated that the cooling structures 30E, 30F and 30G may be modified similarly to the cooling structure 30B shown in FIG. 5 or the cooling structure 30C shown in FIG. 7.

As described above, a liquid crystal display apparatus according to an embodiment of the present invention includes a cooling structure which utilizes latent heat, and therefore is able to effectively suppress a drastic temperature increase in LED units. It will be appreciated that the cooling structure included in a liquid crystal display apparatus according to an embodiment of the present invention is able to straightforwardly lower the temperature of the LED units. In addition to the aforementioned cooling structure, a fan or the like may be provided to further promote radiation from the cooling structure.

DESCRIPTION OF EMBODIMENTS

An embodiment of the present invention may be suitably used as a liquid crystal display apparatus that supports HDR, for example.

REFERENCE SIGNS LIST

10: liquid crystal display panel
20: backlight device
20A, 20B, 20C, 20D, 20E, 20F, 20G, 20H, 20M, 20R: backlight device
22: LED unit
22a: LED chip
22b: LED substrate
24, 24A, 24D: chassis
24a: aperture in chassis
30A, 30B, 30C, 30D, 30E, 30F, 30G: cooling structure
30S, 40S, 50S: enclosed space
30a, 30b, 30c, 30d, 40a: unit cooling structure
32, 42, 52: outer wall
32ss: side face
32ts: upper face
34, 44, 54: coolant (liquid phase)
36, 46, 56: coolant (gas phase)
38, 48, 58: convection control plate

The invention claimed is:

1. A liquid crystal display apparatus comprising a liquid crystal display panel and a backlight device disposed on a rear face of the liquid crystal display panel, wherein,
   the backlight device includes a chassis, a plurality of LED units being disposed on the chassis and arranged in at least one direction, and a cooling structure thermally coupled to rear faces of the plurality of LED units;
   the cooling structure includes a plurality of first enclosed spaces, each of the plurality of first enclosed spaces containing a coolant in which a liquid phase and a gas phase coexist at room temperature; and
   each of the plurality of first enclosed spaces is disposed correspondingly to at least one LED unit among the plurality of LED units arranged in the at least one direction, wherein
   the plurality of LED units are arranged in a matrix having a plurality of rows and a plurality of columns, and each of the plurality of first enclosed spaces is disposed correspondingly to at least one LED unit belonging to one of the plurality of rows of the plurality of LED units.

2. The liquid crystal display apparatus of claim 1, wherein the at least one LED unit comprises at least two LED units.

3. The liquid crystal display apparatus of claim 1, wherein the at least one LED unit comprises all LED units belonging to the one of the plurality of rows of the plurality of LED units.

4. The liquid crystal display apparatus of claim 1, wherein,
   the plurality of LED units define a plurality of units of area division driving; and
   each of the plurality of first enclosed spaces is disposed correspondingly to at least two LED units belonging to two or more different units of driving among the plurality of units of area division driving.

5. The liquid crystal display apparatus of claim 1, wherein,
   the cooling structure includes a plurality of second enclosed spaces, the plurality of second enclosed spaces containing a coolant in which a liquid phase and a gas phase coexist at room temperature; and
   each of the plurality of second enclosed spaces is thermally coupled to at least one of the plurality of first enclosed spaces.

6. The liquid crystal display apparatus of claim 5, wherein each of the plurality of second enclosed spaces is thermally coupled to an upper face of the at least one of the plurality of first enclosed spaces.

7. The liquid crystal display apparatus of claim 5, wherein each of the plurality of second enclosed spaces is thermally coupled to at least two of the plurality of first enclosed spaces.

8. A liquid crystal display apparatus comprising a liquid crystal display panel and a backlight device disposed on a rear face of the liquid crystal display panel, wherein,
   the backlight device includes a chassis, a plurality of LED units being disposed on the chassis and arranged in at least one direction, and a cooling structure thermally coupled to rear faces of the plurality of LED units;
   the cooling structure includes a plurality of first enclosed spaces, each of the plurality of first enclosed spaces containing a coolant in which a liquid phase and a gas phase coexist at room temperature; and each of the plurality of first enclosed spaces is disposed correspondingly to at least one LED unit among the plurality of LED units arranged in the at least one direction, wherein the backlight device further includes a light guiding plate, and the plurality of LED units arranged in the at least one direction are arranged along one side face of the light guiding plate.

9. The liquid crystal display apparatus of claim 8, wherein the cooling structure includes a plurality of second enclosed spaces, the plurality of second enclosed spaces containing a coolant in which a liquid phase and a gas phase coexist at room temperature; and each of the plurality of second enclosed spaces is thermally coupled to at least one of the plurality of first enclosed spaces.

* * * * *